May 15, 1928.  
A. SLAYSMAN, JR  
1,670,051

SHEET TRIMMING AND SLITTING MACHINE

Filed July 18, 1925  9 Sheets—Sheet 1

Inventor  
Alexander Slaysman Jr.

By  
J. L. Wright  
Attorney

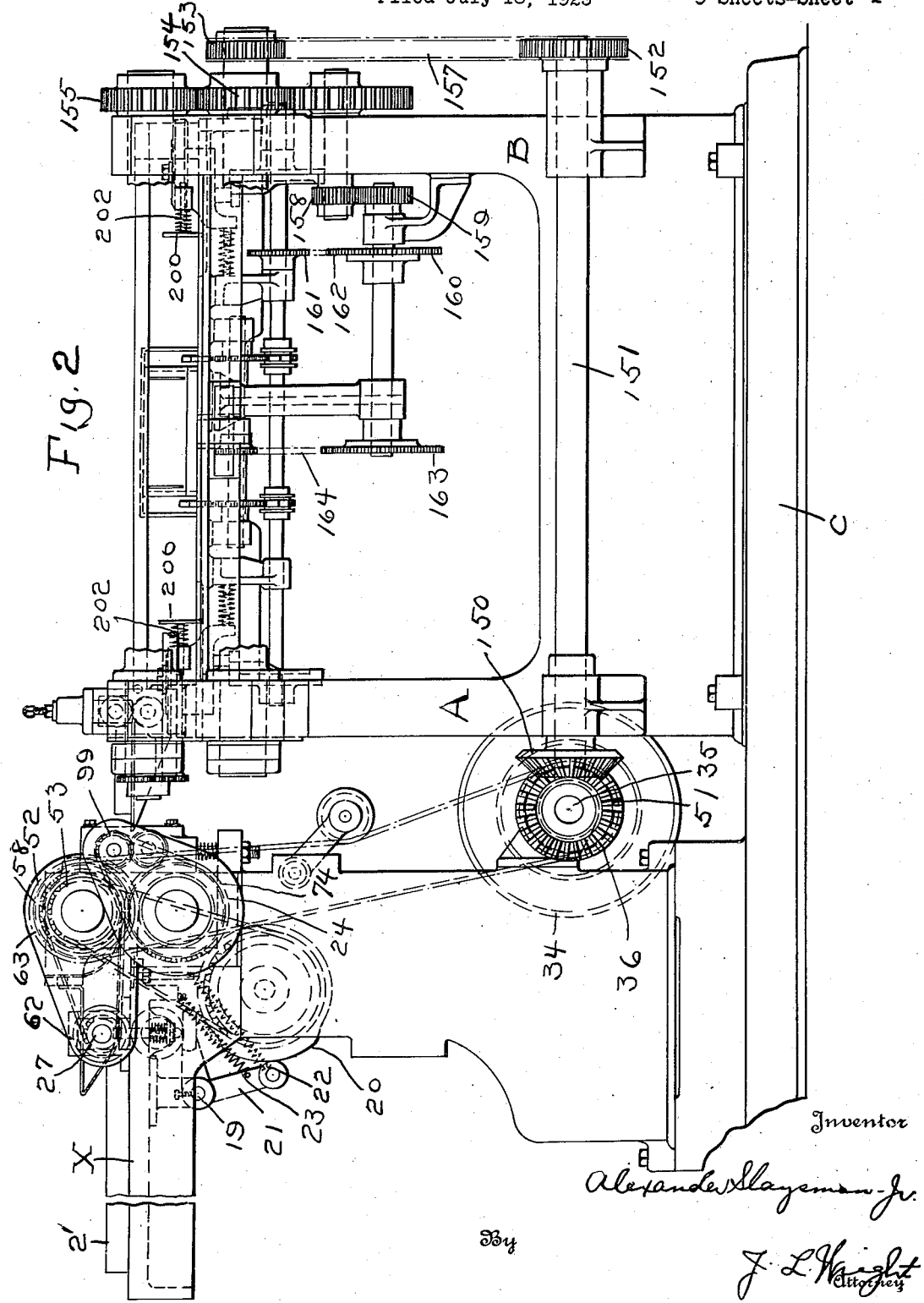

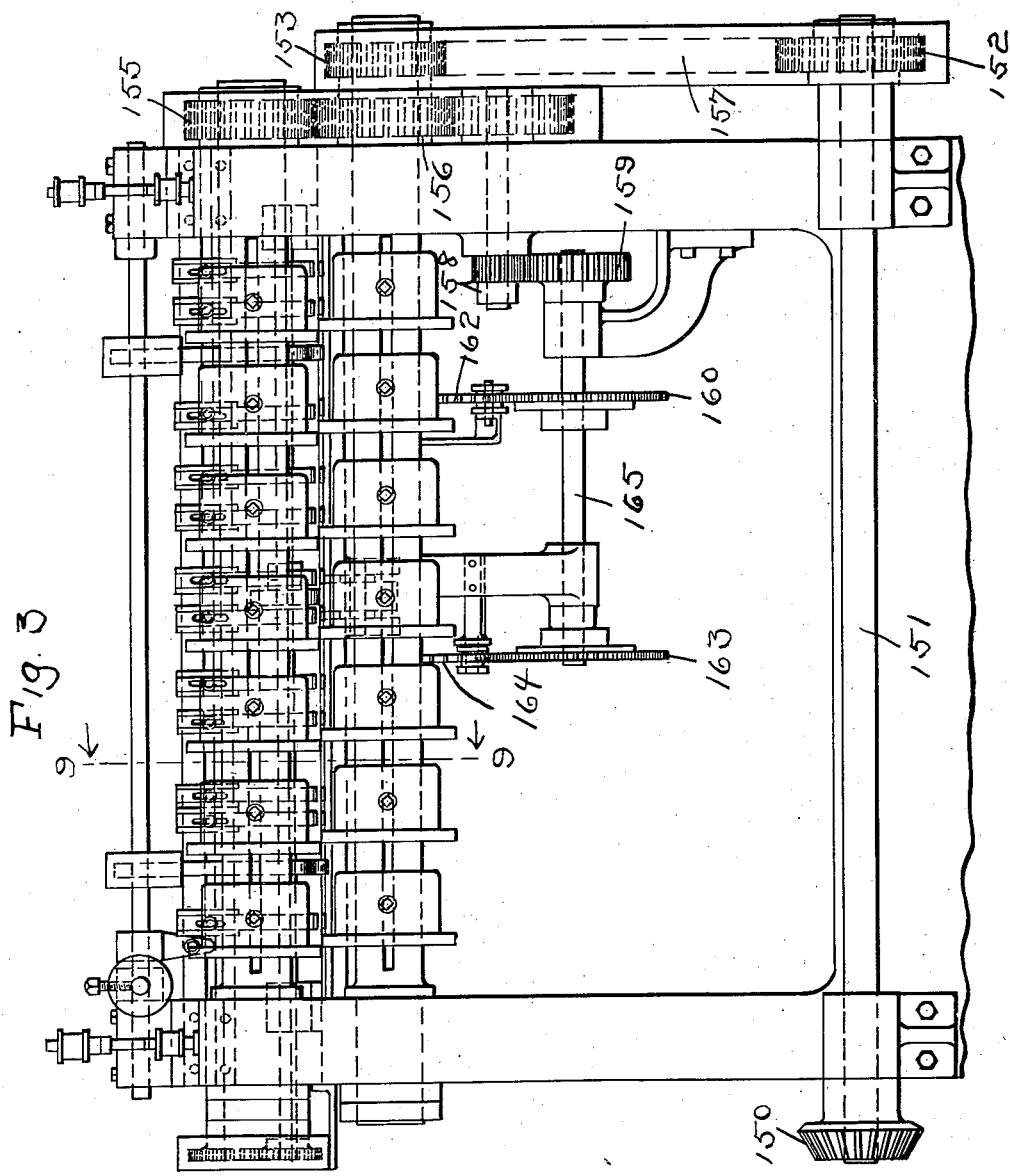

May 15, 1928.  1,670,051
A. SLAYSMAN, JR
SHEET TRIMMING AND SLITTING MACHINE
Filed July 18, 1925    9 Sheets-Sheet 4
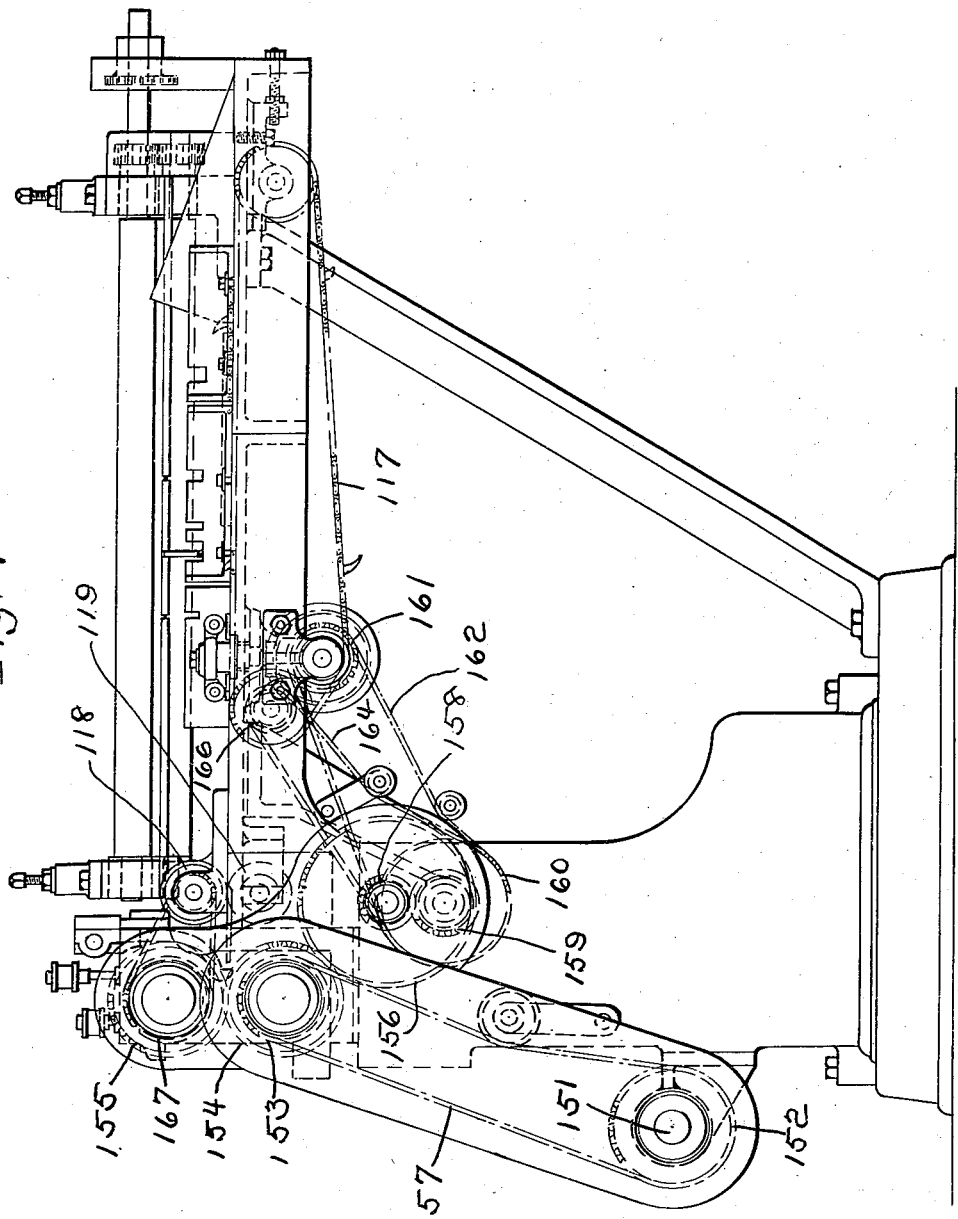
Inventor
Alexander Slaysman Jr.
By
J. L. Wright
Attorney

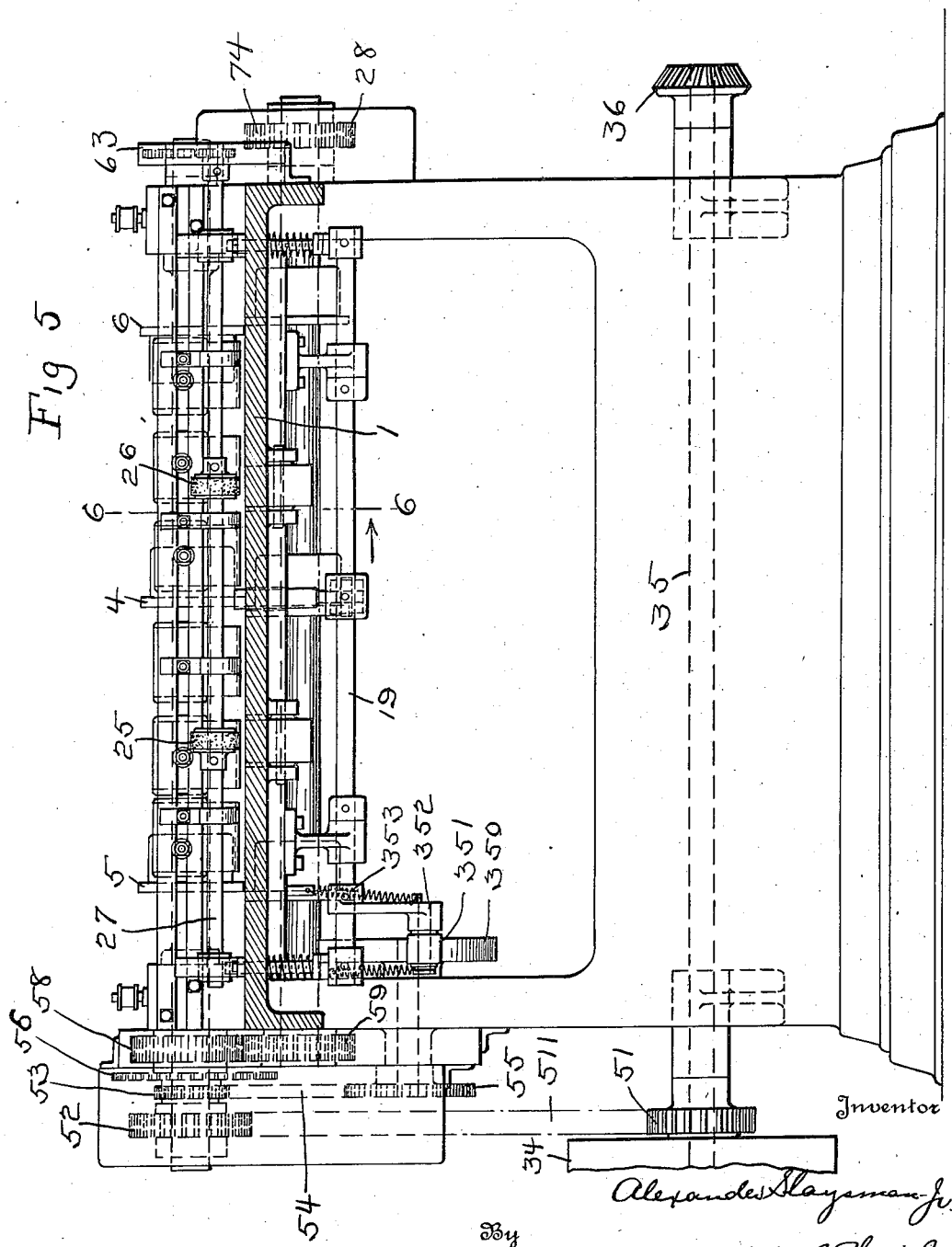

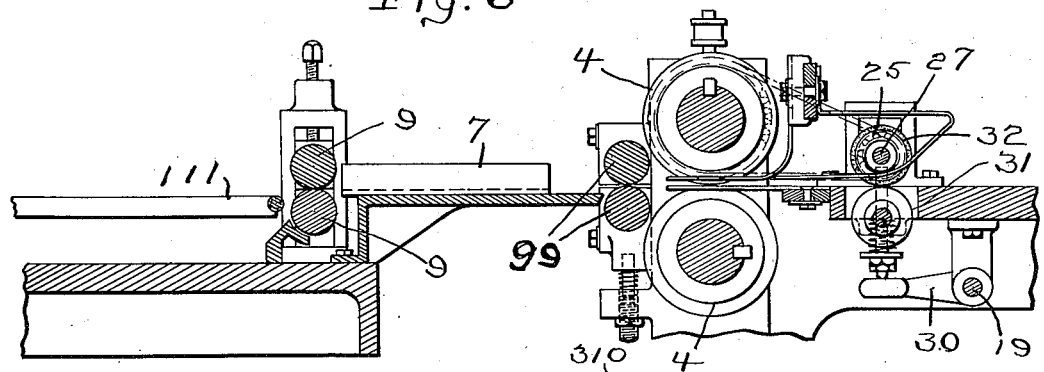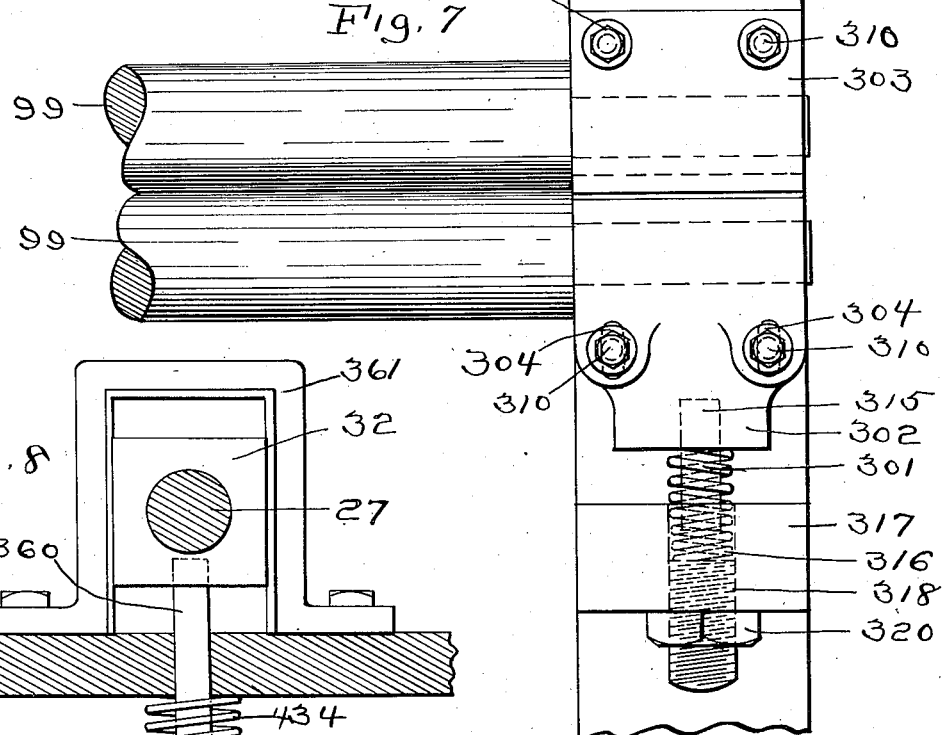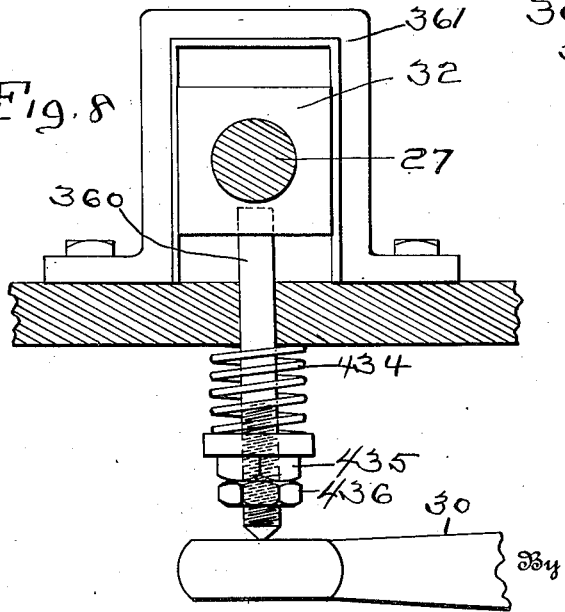

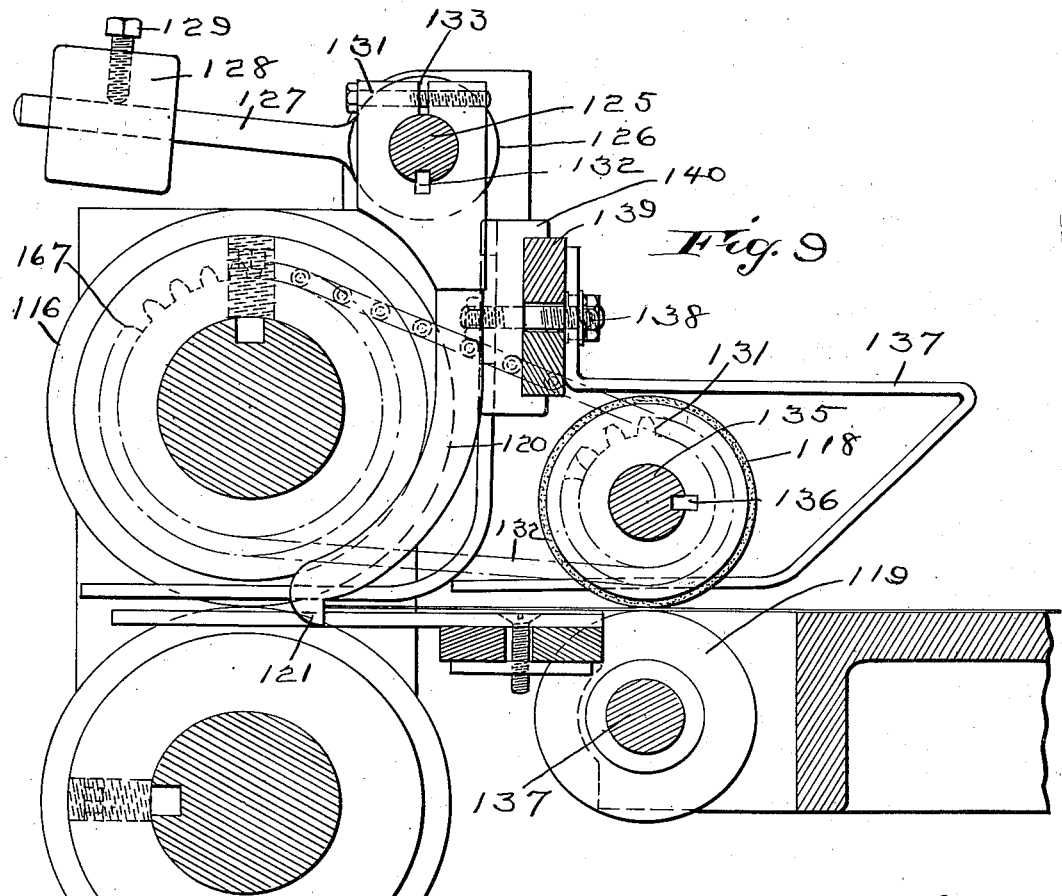
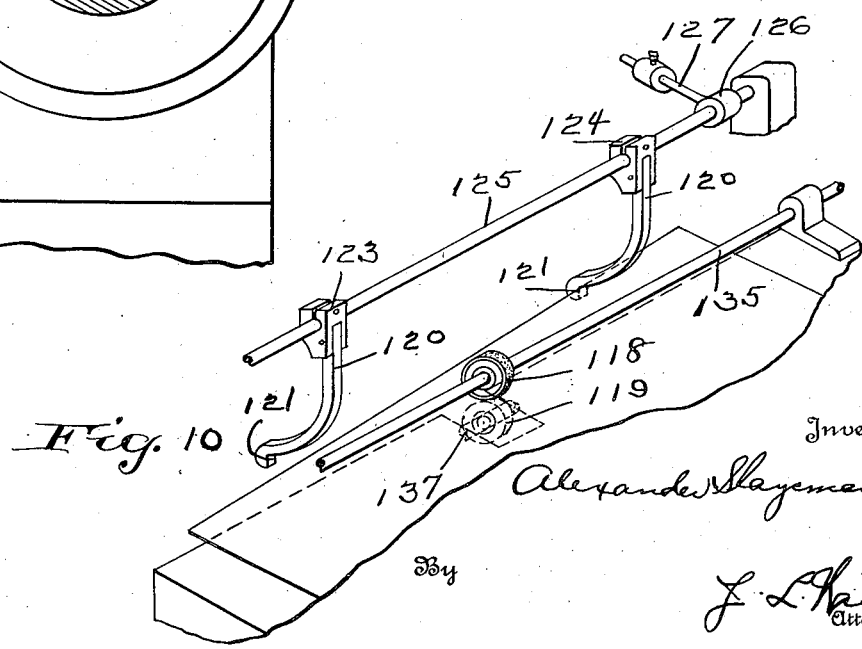

May 15, 1928.
A. SLAYSMAN, JR
1,670,051
SHEET TRIMMING AND SLITTING MACHINE
Filed July 18, 1925
9 Sheets-Sheet 8
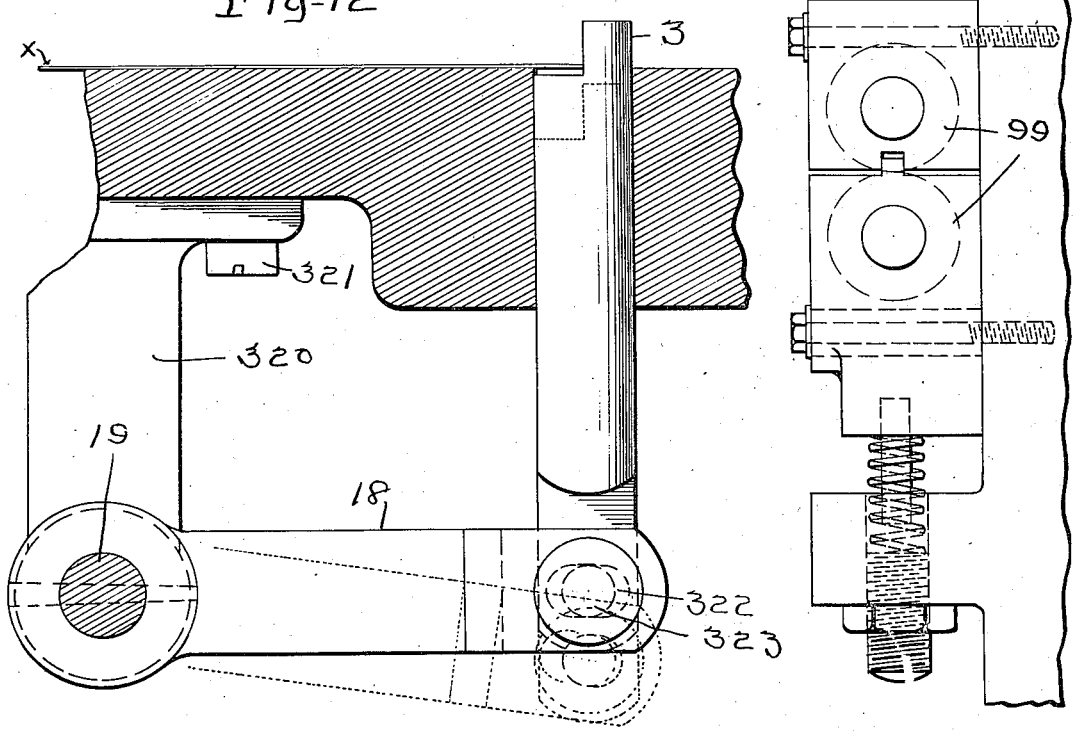
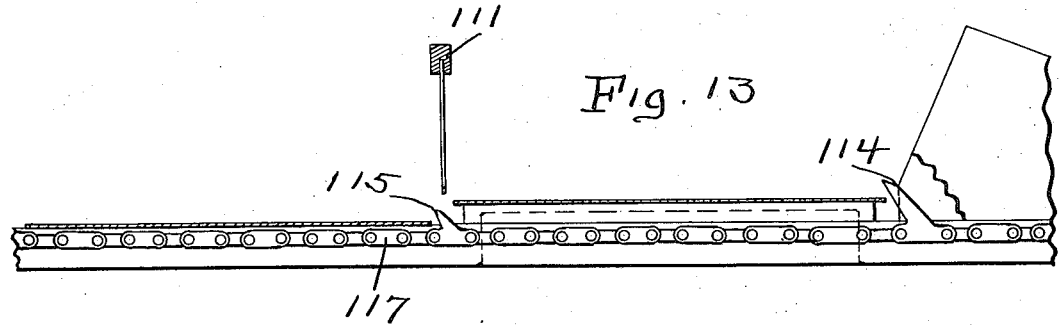
Inventor
Alexander Slaysman Jr.
By
J. L. Wright
Attorney May 15, 1928.
A. SLAYSMAN, JR
1,670,051
SHEET TRIMMING AND SLITTING MACHINE
Filed July 18, 1925      9 Sheets-Sheet 9
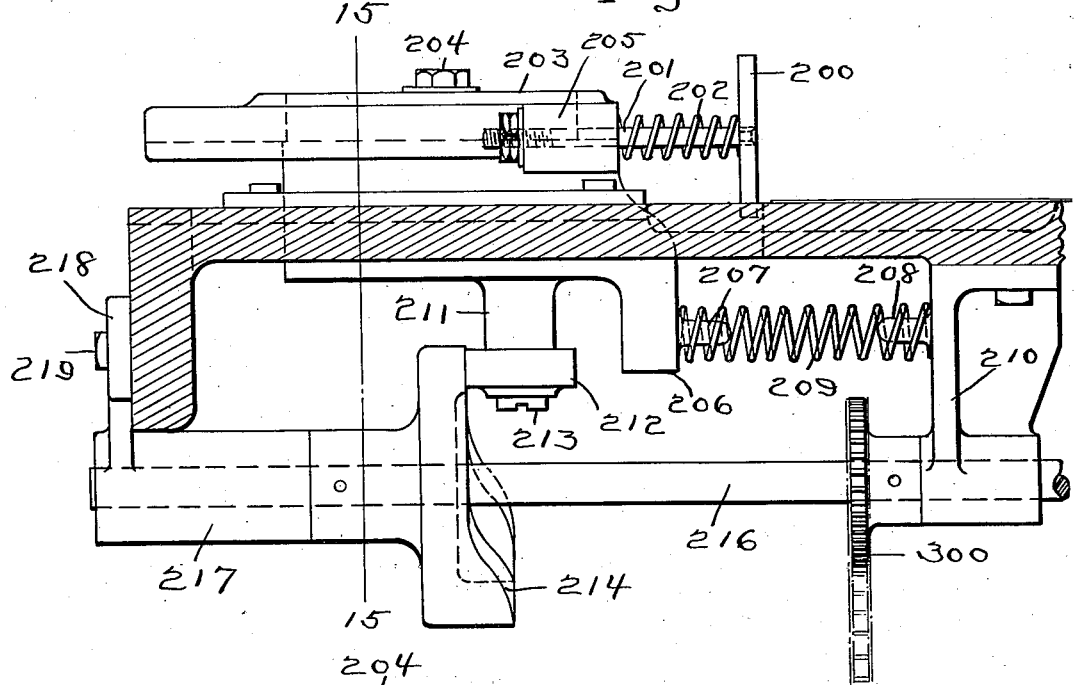
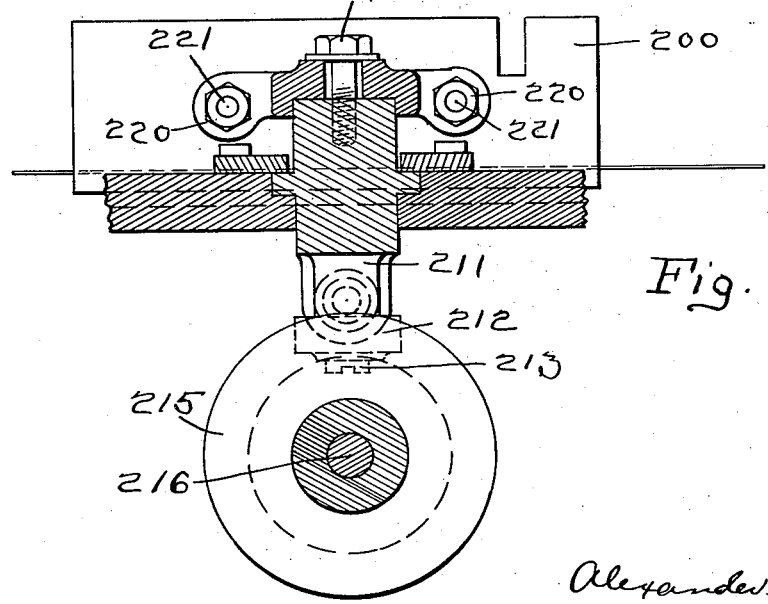
Inventor
Alexander Slaysman Jr.
By
J. L. Wright
Attorney Patented May 15, 1928.

1,670,051

UNITED STATES PATENT OFFICE.

ALEXANDER SLAYSMAN, JR., OF BALTIMORE, MARYLAND.

SHEET TRIMMING AND SLITTING MACHINE.

Application filed July 18, 1925. Serial No. 44,618.

My invention relates to improvement in sheet trimming and slitting machines. My invention relates particularly to machines for cutting strips of tin into blanks for forming can bodies. In machines of this character it is common practise to first cut a sheet of tin into a plurality of strips and then cut these strips at right angles to form additional strips of the proper size and shape to be used in making bodies for cans.

In my invention two sets of cutting rolls are provided for cutting the sheets of tin into a plurality of strips and then cutting these strips at right angles so as to form a plurality of groups of strips. Means are provided for automatically feeding the sheet of tin to the first set of rolls at stated intervals. After the sheet is cut into strips by the first set of rolls the strips are divided into groups or sections and then advanced automatically toward the second set of cutting rolls. These strips are advanced by means of a carrier or conveyor at a predetermined speed. Interposed between the carrier and the second set of cutting rolls is what may be termed a guiding roll for further advancing the strips of tin toward the second set of cutting rolls at a greater speed than advanced by the conveyor. This provision is made for the purpose of causing the strips of tin to leave or disengage the carrier before they engage the second set of cutting rolls.

If the strips were advanced directly to the cutting rolls by the conveyor the edges of the strips would be bent or marred by the conveyor as the tin would be apt to be buckled upon engaging the cutting rolls by being carried forward at the same time by the conveyor.

In order to true or square the strips of tin before they engage the second set of cutting rolls a device is provided whereby the edges of the tin are perfectly aligned with the second set of cutting so that when the second cutting operation is effected the strips are absolutely true and a can body can be accurately formed. The feeding and conveying devices associated with the first or primary cutting rolls are arranged to co-operate with similar devices associated with the second or secondary cutting rolls so as to cause a continuous feed of the strips of tin.

Other features of my invention will be pointed out in the detailed description to follow.

My invention is illustrated in the accompanying drawings wherein:

Fig. 2 is a front elevation of the machine in which the second operation cutting rolls are omitted.

Fig. 3 is a front elevation of the machine with the second operation cutting rolls in position.

Fig. 4 is a side elevation of Fig. 3.

Fig. 5 is a sectional elevation of the machine showing the first operation portion.

Fig. 6 is a sectional view of Fig. 5 on line 6—6.

Fig. 7 is an enlarged detail of the presser rolls and the rear of the first set of rolls belonging to the first operation portion.

Fig. 8 is an enlarged detail showing the bearing for the feed rolls placed before the first operation cutting rolls.

Fig. 9 is an enlarged sectional view of Fig. 3 on line 9—9 showing the second operation cutting rolls and aligning device.

Fig. 10 is a diagrammatic illustration showing the operation of the aligning device for the second operation rolls.

Fig. 11 is a side view of Fig. 7.

Fig. 12 is an enlarged detail showing the mechanism for operating the starting pin associated with the first operation cutting rolls.

Fig. 13 shows a section of the carrier or feeding device for the second operation cutting rolls.

Fig. 14 is an enlarged view partly in section showing one of the positioning devices associated with the second operation cutting rolls.

Fig. 15 is a sectional view of Fig. 14 on the line 15—15.

Figure 1:
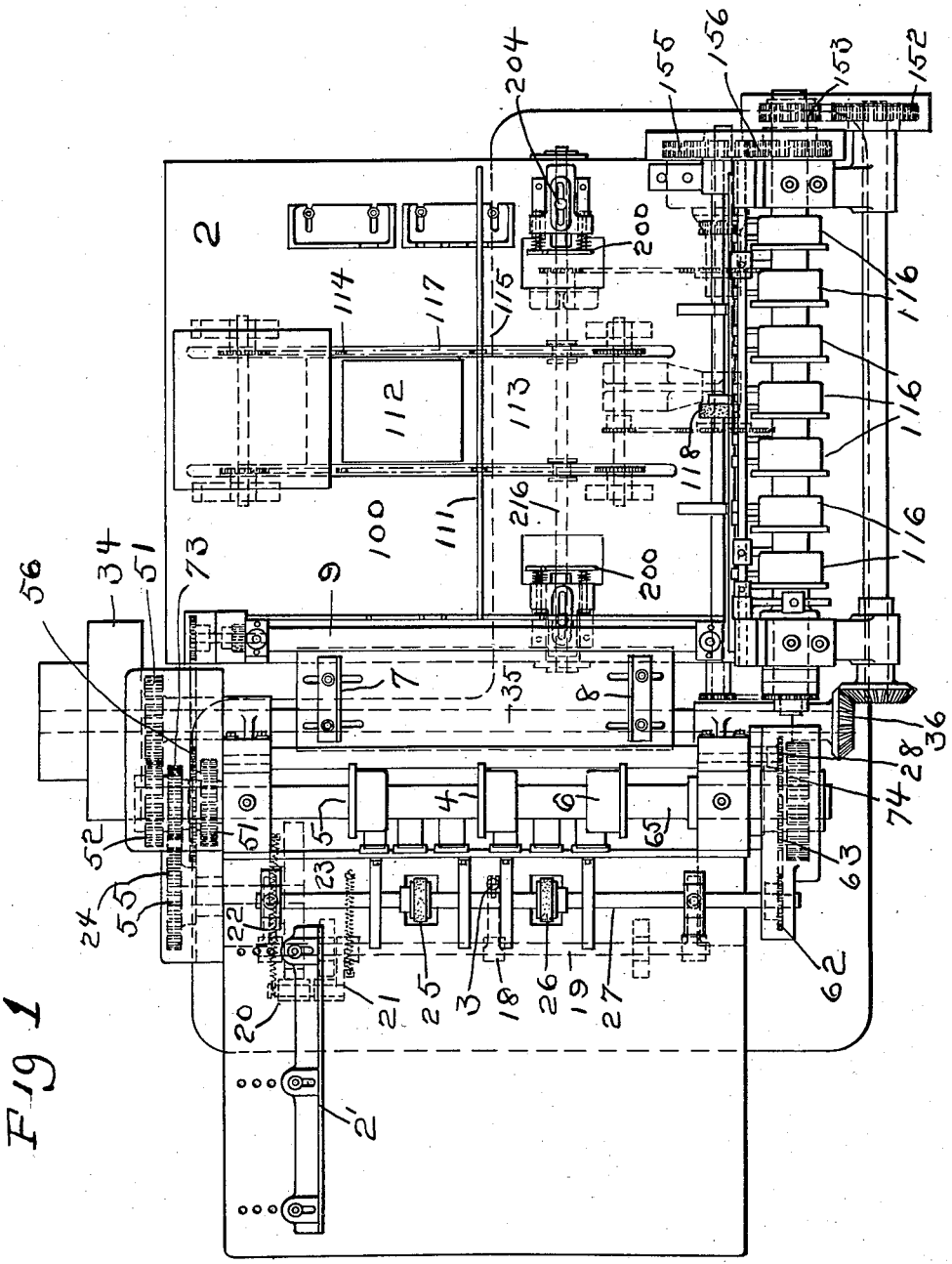
Fig. 1 is a plan view of the machine.

Referring first to Figure 1, it will be noted that the machine comprises two main portions, namely, the first operation cutting rolls and associated mechanism, and the second operation cutting rolls and controlling mechanism.

The machine proper as shown in Figures 1, 2, 3, 4 and 5 comprises what may be termed two tables or bed plates. Bed plate or table No. 1 contains the cutting rolls and controlling mechanism relating to the first cutting operation. The second table No. 2 contains the second operation cutting rolls and associated mechanism. Each table or bed plate is supported by legs A and B respectively which are fastened to a base C. In order to cause proper co-operation between the mechanism associated with table No. 1 and table No. 2 are driving gears and shafts which when driven from a common source cause the proper operation of the mechanism associated with each table.

The main shaft 35 is provided with a pulley 34 which serves as an initial drive for the entire machine. As shown in Figures 1 and 2 the shaft 151 of No. 2 table is driven by means of the mitre gear 36 which engages a mitre gear 150. The mitre gear 36 is rigidly attached to the shaft 35 while gear 150 is rigidly attached to shaft 151.

The operation of the various auxiliary shafts and gears will be fully explained in the detailed description to follow.

Referring particularly to Fig. 1 it will be noted that table No. 1 is provided with the cutting rolls 4, 5 and 6. When it is desired to cut a sheet of tin, said sheet is first placed upon table No. 1 with one edge in engagement with the aligning device 2'. The sheet of tin is thrust forward by the operator until it engages stop pin 3 at which time the feeding rolls 25 and 26 are lifted above the surface of the table by means of mechanism the operation of which will be later explained. When the feeding rolls 25 and 26 are above the surface of the table, the sheet of tin can be moved forward until it engages stop pin 3 which at this time projects above the surface of table No. 1. After a certain interval the feed rolls 25 and 26 move downward and engage the sheet of tin lying upon the surface of table No. 1. At this time by means of suitable mechanism stop pin 3 is withdrawn below the surface of table No. 1 and the friction exerted by the rotating rolls 25 and 26, feeds the sheet of tin toward and in engagement with cutting rolls 4, 5 and 6. Rolls 5 and 6 simply serve to trim the edges of the sheet of tin while roll 4 serves to split the sheet of tin into two pieces or strips.

The sheet of tin in passing through the cutting rolls engages a second set of presser rolls 99 which are shown in detail in Fig. 6. These rolls are for the purpose of carrying the cut sheet of tin toward the second operation on No. 2 table as the cutting rolls themselves cannot be relied upon to feed the cut tin especially after the rear portions of the sheets leave the rolls.

Referring particularly to Fig. 6 it will be noted that the feed rolls 9 associated with the second operation table are arranged to engage the cut sheet of tin after it is engaged by rolls 99. The rolls 9 serve to carry the sheet of tin directly to the second operation table No. 2.

As shown in Fig. 1 table No. 1 is provided with the two adjustable guides 7 and 8 which engage the edges of the cut sheet of tin as it passes from No. 1 to No. 2 table.

After the cut sheet of tin passes from table No. 1, rolls 25 and 26 are automatically caused to lift above the surface of the table and pin 3 to project above the surface of the table so that another sheet of tin may be fed to the cutting rolls by the operator.

The mechanism for causing the automatic operation of the feed rolls 25 and 26 and the stop pin 3 is illustrated in detail in Figs. 6, 8 and 12, the operation of which will be described later.

Referring to Figs. 1, 2, 3 and 4 it will be noted that No. 2 table is provided with a dividing bar 111 which serves to separate the two portions of the cut piece of tin after it leaves the rolls 9 as plainly illustrated in Fig. 6. One of the strips of the cut portion falls or rests upon the raised portion 112 of table No. 2 while the other strip rests upon the surface 113 of table No. 2 which is slightly lower than portion 112.

That portion or strip of tin resting upon the raised portion 112 is engaged by the finger 114, which as shown in Fig. 13 is slightly longer than that of finger 115 which serves to engage the strip of tin lying upon portion 113 of table No. 2.

The chain 117 carrying fingers 114 and 115 moves at a pre-determined speed and advances the two strips of tin toward the second operation cutting rolls 116. Before the strips of tin engage the rolls 116 and before they leave the carrier comprising the chain 117 and fingers 114 and 115, they are engaged by a pair of aligning plates 200 which move back and forth at proper intervals to align or place in position the sheets of tin before or as they leave the carrier.

The mechanism for operating this aligning device is illustrated in detail in Figs. 14 and 15. As shown in these two figures the aligning devices or plates 200 are attached to a movable carriage. The plate 200 is attached to a shaft 201 which passes through portion 205 of the carriage and its outer threaded end at 221 is provided with adjusting nuts 220. Surrounding the shaft 201 is a tension spring 202 which engages the inner portion of the plate 200 and the shoulder of the carriage 205, serving to force the plate 200 in an outward direction. The upper portion of the carriage is slotted as shown in Fig. 1 and a pin or bolt passes through the slot to adjust the position of the carriage. The carriage passes through a slot in table No. 2 and the lower portion is provided with a pin 207 which engages a tension spring 209 the opposite end of the spring engages a corresponding pin 208 attached to a bracket 210 fastened to the under portion of table No. 2. The lower portion is also provided with a projection 211 which serves to carry a rotating collar held in place by means of the bolt or screw 213.

Supported by brackets 217 and 210 is a shaft 216 driven by a sprocket chain 300. Mounted upon the shaft is a cam 215 provided with the raised surface 214. As the shaft rotates the lower and raised portion of the cam 215 engages the roll 212 and causes the carriage carrying the plate 200 to move back and forth at regular intervals.

After a strip of tin is positioned by the plates 200 it is carried forward by the carrier toward the cutting rolls 116. Placed in advance of the cutting rolls is an aligning device illustrated in detail in Fig. 9 and diagrammatically in Fig. 10.

Roll 118 is driven by means of sprocket wheels 167 and 131 by means of chain 132. The speed of rotation of roll 118 is such that when the rear edge of the sheet of tin leaves the carrier, it is carried forward at a greater speed than formerly. This change of speed is in order to prevent the edges of the strip of tin to be bent or marred in any way for as soon as the strip of tin engages the roll 118 it is pulled forward toward the cutting rolls 116 causing the rear edge to leave the carrier before the front edge of the tin engages the cutting rolls 116.

Associated with roll 118 there are two arms 120 mounted upon a shaft 125. Each arm is provided with a flat portion 121 which is engaged by the forward edge of the strip of tin before it engages cutting rolls 116. The roll 118 is positioned midway between the two arms 120 and serves as a pivot about which the sheet of tin may swing. At the time the sheet of tin leaves the carrier and before it even engages portions 121 of the arms 120 its only bearing is between roll 118 and the idler roll 119. The flat portions 121 are adjusted to and in direct alignment with the cutting rolls. In case the sheet of tin after leaving the carrier and upon engaging roll 118 should be out of alignment so that the front edge engages but one of the portions 121 of the arms 120 it will rotate or swing about rolls 118 and 119 as an axis and as it moves forward toward the rolls, the edge of tin will be engaged by both arms 120 and place it in perfect alignment with the cutting rolls 116.

The shaft 125 upon which the arms 120 are mounted is provided with an adjustable weight 128 mounted upon an arm 127, also attached to shaft 125 by means of the keyway 132 and the adjusting screw 131 passing through the slotted portion 133 forming part of an arm 127. The weight 128 may be positioned upon the arm 127 by means of the set screw 129.

As shown in Fig. 9 a set of guide pieces 137 are positioned before roll 118 so that the edge of the sheet of tin may be forced downward to engage the bottom portion of the roll 118. These guides are fastened to a bracket 140 of table No. 2 by means of bolts or screws 138.

Referring to Figs. 7 and 11 the rolls 99 are mounted so that the lower roll is held in yielding engagement with the upper roll. This is accomplished by having the upper roll 99 mounted in a bracket 303 positioned above bracket 304 within which the lower roll 99 is mounted. As shown these two brackets are mounted upon table No. 1 by means of bolts or screws 310. The lower bracket is provided with slotted openings through which the bolts 310 pass.

As shown in Fig. 7 the lower bracket is provided with an opening 315 for engaging the reduced portion of screw 316. This screw is threaded into bracket 317 at its enlarged portion 318 and held in place by means of lock nut 320. Surrounding the reduced portion is a spiral spring which serves to force the lower bracket containing the lower roll 99 into engagement with the upper roll 99. A suitable tension may be made between the upper and lower rolls 99 by simply regulating the set screw and lock nut 320.

Referring to Fig. 12 it will be noted that the pin 3 passes through table No. 1 and its upper portion is cut away to present a flat surface to a sheet of tin X. Mounted upon the lower portion of table No. 1 is a bracket 320 fastened thereto by means of a bolt 321.

The lower portion of the bracket supports a shaft 19 upon which is fastened an arm 18 which engages the lower portion of the pin 3. The lower portion of the pin is provided with an oval opening 322 through which passes a pin 323 attached to the end of the arm 18. As the shaft 19 rocks or moves back and forth the arm 18 moves up and down causing the pin 3 to pass above or below the surface of table No. 1 in proper sequence.

Mounted upon the same shaft 19 are two arms 30 which serve to lift the feed rolls 25 and 26 shown in detail in Figs. 6 and 8.

The cam arrangement causing the rocking of the shaft is shown in Fig. 5. The cam is provided with a raised portion 350 which engages a roller 351, attached to the lower end of the arm 352. The upper end of the arm is fastened to the shaft 27 and 353.

As the cam rotates the raised portion 350 engages and disengages rolls 351 causing arm 352 to move back and forth and rock arm 352 and consequently causing the rocking of the shaft 27. As shown in Fig. 12 the arm 18 rocking back and forth causing the movement of pin 3 and likewise the rocking of the shaft causing the movement of arm 30. The operation of arm 30 as shown in Fig. 8 lifts the pin 360 to engage the sliding block 32 which moves or slides up and down in the bracket 361.

Passing through the block 32 is shaft 27 upon which are mounted the rolls 25 and 26. As the arm 30 lifts the block 32 and the rolls 25 and 26, arm 18 lifts pin 3. And as these two arms drop back then rolls 25 and 26 pass above the surface of table No. 1 and pin 3 passes below the surface of table No. 1. For means of adjustment the pin 360 is provided with a threaded portion engaged by the lock nuts 435 and 436 for regulating the tension of spring 434 which surrounds pin 360. The spring 434 tends to force the pin downward and carry with it plate 32 and rolls 25 and 26.

Having described the various parts of the machine I will now show how the driving mechanism operates in conjunction with table No. 1. Mounted upon shaft 35 containing the main drive pulley 34 is a sprocket wheel 51. This wheel by means of sprocket chain 511 drives wheel 52 which in turn drives wheel 58 on shaft 65 upon which are mounted the upper set of cutting rolls 4, 5 and 6.

The lower set of cutting rolls co-operating with the upper set are mounted upon a separate shaft driven by wheel 59 operated by wheel 58.

Mounted upon shaft 65 are wheels 53 and 56. Wheel 53 by means of chain 54 drives wheel 55 mounted upon the same shaft as cam 350 which imparts movement to shaft 19. Wheels 56 by means of a chain drive operates wheel 60 causing the rotation of rolls 9.

Mounted upon the opposite end of upper cutting roll shaft 65 is a wheel 63 which by means of a chain drives wheel 62 mounted upon shaft 27 causing the rotation of rolls 25 and 26.

Mounted upon the lower cutting roll shaft is a wheel 74 which by means of a chain causes the operation of wheel 28 which drives rolls 99.

In the operation of the machine a sheet of tin is placed upon table No. 1 by the operator with its front edge engaging the pin 3 when rolls 25 and 26 are lifted. When the rolls are lowered the sheet of tin is carried to the cutting rolls 4, 5 and 6. After the front edge of the tin leaves the rolls 99, and carried between the guides 7 and 8 toward rolls 9, the cut sheet of tin which is in two parts is carried to table No. 2, one part lying to one side of dividing strip 111 upon raised portion 112 of table No. 2. The other part lying upon the opposite side of strip 111 rests upon the lower portion 113 of table No. 2.

By means of the fingers 114 and 115 of the carrier the two parts are carried toward the second set of cutting rolls 116 which comprise an upper and lower set as shown in Fig. 3.

As the two parts are carried forward they are lined up by means of the two plates 200.

After leaving the carrier each plate or part of the sheet of tin is engaged by the roll 118 which co-operates with the two arms 120 to align the sheet of tin with the cutting rolls 116. After engaging the rolls 116 each sheet of tin is cut into a plurality of strips.

While I have shown the various parts controlled by sprocket wheels and chains it naturally follows that any standard form of gearing or drives may be used.

Instead of having the sheet of tin first cut into two parts a larger number of cutting rolls may be associated with No. 1 table and the proper number of dividing strips 111 associated with No. 2 table and the carrier arranged to feed the additional strips.

Having thus described my invention what I desire to secure by Letters Patent is.

1. In a machine for cutting sheets of tin, the combination of a plurality of primary cutting rolls, a plurality of secondary cutting rolls arranged at right angles to said first rolls, automatic means comprising a periodically operated stop device for permitting feeding a sheet of tin to said primary cutting rolls at stated intervals for cutting the sheet into a plurality of strips, a device for dividing the strips into groups, and means for automatically feeding the said groups to said secondary cutting rolls for cutting the strips into a plurality of parts and means operated periodically to engage the strips while they are being fed so as to position them before said secondary cutting rolls, and additional means to true the strips before they enter said secondary cutting rolls.

2. In a machine for cutting sheets of tin, the combination of a plurality of primary and secondary cutting rolls, automatic means comprising a periodically operated stop device for permitting regulating the feeding of a sheet of tin to said primary cutting rolls at stated intervals for cutting the sheet into a plurality of strips, means for dividing said strips into groups, and means for automatically feeding said groups to said secondary cutting rolls for cutting the strips into a plurality of parts, a device comprising a pair of swinging arms and a rotating roll having a speed greater than that of the feeding means, said arms serving to engage and true the strips before they enter the secondary cutting rolls, said roll acting as a pivot for said strips and for causing them to leave said feeding means.

3. In a machine for cutting sheets of tin, the combination of a plurality of primary cutting rolls, a plurailty of secondary cutting rolls arranged at right angles to said first rolls, automatic means comprising a periodically operated stop device for permitting feeding a sheet of tin to said primary cutting rolls at stated intervals for cutting the sheet into a plurality of strips, means for dividing the strips into groups, means for automatically feeding the groups to said secondary cutting rolls for cutting the strips into a plurality of parts, all of said means arranged to automatically co-operate to cause a continuous and non-interferring feeding of the sheets of tin to said cutting rolls, a pair of swinging arms, a roll traveling at a speed greater than the speed of the feeding means for the secondary cutting rolls, said roll causing the strips to leave the feeding means and to engage the arms for trueing before they enter the secondary cutting rolls.

4. In a machine for cutting sheets of tin, the combination of a plurality of cutting rolls, a pair of swinging arms, a rotating roll for forcing the sheets of tin in engagement with said arms for trueing and then forcing the sheets into engagement with the cutting rolls, said rotating roll acting as a pivot for the sheets of tin while being trued.

5. In a machine for cutting sheets of tin, the combination of a plurality of cutting rolls, a single roll positioned before said cutting rolls, two arms positioned between the cutting and guiding rolls, said arms and roll serving to true the sheet of tin before it engages said cutting rolls.

6. In a machine for cutting sheets of tin, the combination of a plurality of cutting rolls, a pair of swinging arms positioned before said cutting rolls, a single roll positioned before and between said arms for advancing the sheets of tin to said cutting rolls, said arms engaging the front edge of sheets and the single roll acting as a pivot to true the sheets of tin before engaged by said cutting rolls.

7. In a machine for cutting sheets of tin, the combination of a plurality of cutting rolls, automatic stop means periodically operated to permit feeding a sheet of tin to said cutting rolls at stated intervals so the sheet may be cut into a plurality of strips by said rolls.

8. In a machine for cutting sheets of tin, the combination of a plurality of cutting rolls, automatic stop means periodically operated, feeding a sheet of tin to said cutting rolls at stated intervals for cutting the sheet into a plurality of strips, and means for dividing the strips into groups.

9. In a machine for cutting sheets of tin, a plurality of cutting rolls, a device comprising a plurality of fingers for engaging and for feeding a sheet of tin to said cutting rolls at a predetermined speed, an auxiliary roll positioned between said cutting rolls and said device for advancing the sheet of tin to said cutting rolls at a speed greater than the pre-determined speed of the device for disengaging the sheet of tin from said fingers before it is fed to said rolls.

10. In a machine for cutting sheets of tin, the combination of a plurality of cutting rolls, a device comprising a plurality of fingers for engaging and advancing a sheet of tin to said cutting rolls at a certain speed, and means interposed between the cutting rolls and said advancing device for causing the sheet of tin to advance to the cutting rolls at a speed greater than that of the advancing device for disengaging the sheet of tin from said fingers before it is advanced to said cutting rolls.

11. In a machine for cutting sheets of tin, the combination of a plurality of primary and secondary cutting rolls, automatic means for feeding a sheet of tin to said primary cutting rolls at stated intervals for causing the sheet to be cut into a plurality of strips, means for dividing the strips into groups, a device comprising a plurality of fingers for engaging and for automatically feeding the groups of strips to the secondary cutting rolls at a pre-determined speed, a device interposed between said secondary cutting rolls and said feeding device for advancing the groups of strips to the secondary cutting rolls at a speed greater than that of the feeding device for disengaging the strips from said fingers before they are fed to said rolls.

12. In a machine for cutting sheets of tin, the combination of a table provided with raised and lower portions, means to feed a strip of tin to the raised portion and another strip to the lower portion, a set of cutting rolls and a carrier, means associated with said carrier for advancing both strips of tin in sequence to said cutting rolls.

13. In a machine for cutting sheets of tin, the combination of a table provided with raised and lower portions, means to feed a strip of tin to the raised portion and another strip to the lower portion, a set of cutting rolls and a carrier, said carrier provided with sets of fingers, one set of fingers engaging one sheet of tin and advancing it to said cutting rolls, another set of fingers engaging the other sheet of tin and advancing it to said cutting rolls.

14. In a machine for cutting sheets of tin into strips, the combination of a plurality of cutting rolls, automatic means for feeding a sheet of tin to said cutting rolls, and means operated periodically to engage the two sides of the sheet while it is being fed to position it before said cutting rolls.

15. In a machine for cutting sheets of tin into strips, the combination of a plurality of cutting rolls, automatic means for feeding the sheets of tin to said cutting rolls, means operated periodically to engage the sides of the sheets while being fed to position them before said cutting rolls, and additional means to true the front edges of said strips before they enter said cutting rolls.

16. In a machine for cutting sheets of tin into strips, the combination of a plurality of cutting rolls, means for feeding the sheets of tin to said cutting rolls, a pair of periodically operated means to engage the side edges of the sheets to position them before said cutting rolls, additional means comprising a roll acting as a pivot for the sheets of tin and a pair of swinging arms engaging the front edges of the sheets to true them before they enter said cutting rolls.

In testimony whereof I affix my signature.

ALEXANDER SLAYSMAN, Jr.